US009092604B2

(12) United States Patent
Yamashita

(10) Patent No.: US 9,092,604 B2
(45) Date of Patent: Jul. 28, 2015

(54) COMMUNICATION DEVICE, COMMUNICATION SYSTEM, AND COMPUTER READABLE RECORDING MEDIUM RECORDING COMMUNICATION PROGRAM

(75) Inventor: Reiko Yamashita, Anpachi-gun (JP)

(73) Assignee: KYOCERA CORPORATION, Kyoto (JP)

(*) Notice: Subject to any disclaimer, the term of this patent is extended or adjusted under 35 U.S.C. 154(b) by 436 days.

(21) Appl. No.: 13/322,180

(22) PCT Filed: May 24, 2010

(86) PCT No.: PCT/JP2010/058753
§ 371 (c)(1),
(2), (4) Date: Nov. 23, 2011

(87) PCT Pub. No.: WO2010/137561
PCT Pub. Date: Dec. 2, 2010

(65) Prior Publication Data
US 2012/0062496 A1 Mar. 15, 2012

(30) Foreign Application Priority Data

May 27, 2009 (JP) ................................. 2009-128165

(51) Int. Cl.
G06F 3/041 (2006.01)
G06F 21/32 (2013.01)
(Continued)

(52) U.S. Cl.
CPC ................ *G06F 21/32* (2013.01); *G06F 3/011* (2013.01); *G06T 1/0021* (2013.01)

(58) Field of Classification Search
USPC ................... 345/173–178; 713/186; 382/115; 178/18.01–20.04
See application file for complete search history.

(56) References Cited

U.S. PATENT DOCUMENTS 6,612,928 B1 * 9/2003 Bradford et al. ................ 463/29
8,336,090 B2 * 12/2012 Ache et al. ........................ 726/9
(Continued)

FOREIGN PATENT DOCUMENTS

JP A-5-103068 4/1993
JP A-2004-5007 1/2004
(Continued)

OTHER PUBLICATIONS

International Search Report issued in International Patent Application No. PCT/JP2010/058753 dated Aug. 10, 2010 (with translation).
(Continued)

Primary Examiner — Kent Chang
Assistant Examiner — Gerald Oliver
(74) Attorney, Agent, or Firm — Oliff PLC

(57) ABSTRACT

A table storage unit stores a table that determines correspondence between information about another communication device and biological information of a user of the another communication device. A display unit displays one or a plurality of items. An input unit accepts operation using part of a biological body of the user. An instruction specification unit specifies data about an item displayed on the display unit that has been selected by operation on the input unit by the user. A fingerprint information generation unit generates first biological information representing a biological feature of the user who has selected the item. A device specification unit specifies a communication device corresponding to the generated first biological information by referring to the table. A communication unit transmits the specified data to the specified communication device.

12 Claims, 17 Drawing Sheets

(51) Int. Cl.
*G06T 1/00* (2006.01)
*G06F 3/01* (2006.01)

(56) References Cited

U.S. PATENT DOCUMENTS

| | | | |
|---|---|---|---|
| 2006/0281409 A1* | 12/2006 | Levien et al. | 455/41.2 |
| 2007/0225074 A1* | 9/2007 | Dabrowski | 463/36 |
| 2007/0226516 A1* | 9/2007 | Kubota et al. | 713/186 |
| 2007/0294746 A1* | 12/2007 | Sasakura et al. | 726/2 |
| 2009/0083850 A1* | 3/2009 | Fadell et al. | 726/19 |
| 2009/0091542 A1* | 4/2009 | Inaba et al. | 345/173 |
| 2009/0254757 A1* | 10/2009 | Toyama et al. | 713/186 |

FOREIGN PATENT DOCUMENTS

| | | |
|---|---|---|
| JP | A-2004-328144 | 11/2004 |
| JP | A-2005-268853 | 9/2005 |

OTHER PUBLICATIONS

Compose Mail from Address Book/Help Internet, dated Jul. 14, 2011 (with partial translation). http://imode.net/cmn/help/address/address_mail.html.

Office Action issued in Japanese Patent Application No. 2009-128165 mailed Jul. 30, 2013.

Jan. 7, 2014 Japanese Office Action issued in U.S. Appl. No. 2009-128165 (with Concise Explanation).

* cited by examiner (a)

(b)

COMMUNICATION DEVICE, COMMUNICATION SYSTEM, AND COMPUTER READABLE RECORDING MEDIUM RECORDING COMMUNICATION PROGRAM

TECHNICAL FIELD

The present invention relates to a communication device, a communication system, and a computer readable recording medium recording a communication program.

BACKGROUND ART

When data is communicated between a plurality of communication devices, data to be transmitted and a receiver need to be specified. For mail transmission, for example, a receiver is specified with a method of selecting an address of the receiver from an address book (see Non-Patent Literature 1 (Compose Mail from Address Book/Help Internet (https://imode.net/cmn/help/address/address_mail.html)), for example). Bluetooth employs a method of selecting a receiver from an ID list.

CITATION LIST

Non Patent Literature

NPL 1: Compose Mail from Address Book/Help Internet (https://imode.net/cmn/help/address/address_mail.html)

SUMMARY OF INVENTION

Technical Problem

With the conventional methods of specifying a receiver, however, a receiver needs to be selected from an address book or an ID list even if the receiver is right in front. Further, if there are a large number of entries registered in an address book or an ID list, or if there are similar registered names, selecting a destination becomes cumbersome, and an erroneous selection may be made.

Accordingly, an object of the present invention is to provide a communication device, a communication system, and a computer readable recording medium recording a communication program allowing a data destination to be readily specified.

Solution to Problem

In order to solve the problems described above, a communication device in an embodiment of the present invention includes a storage unit for storing information about another communication device and biological information of a user of the another communication device associated with each other, a display unit for displaying one or a plurality of items, an input unit for accepting operation using part of a biological body of the user, an instruction specification unit for specifying data about an item displayed on the display unit that has been selected by operation on the input unit by the user, a biological information generation unit for generating first biological information representing a biological feature of the user who has selected the item, a device specification unit for specifying a communication device corresponding to the generated first biological information by referring to the storage unit, and a communication unit for transmitting the specified data to the specified communication device.

Advantageous Effects of Invention

According to an embodiment of the present invention, a data destination can be readily specified.

DESCRIPTION OF EMBODIMENTS

Embodiments of the present invention will be described hereinafter with reference to the drawings.

[First Embodiment]

(Overview)

Figure 1:
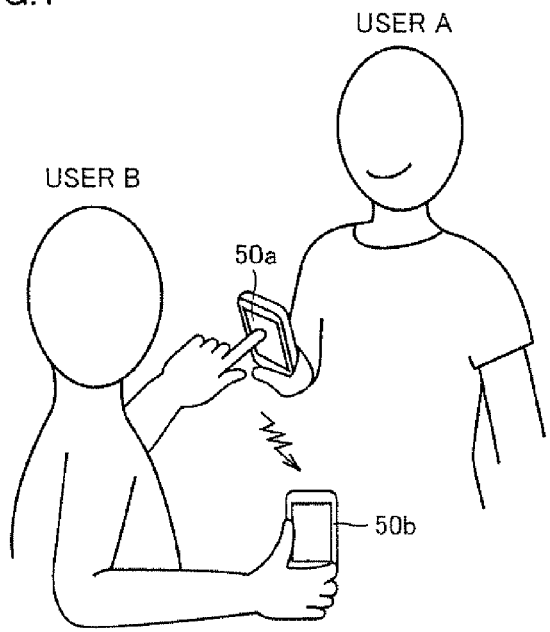
FIG. 1 illustrates an overview of a communication system in a first embodiment of the present invention.

FIG. 1 illustrates an overview of a communication system in a first embodiment of the present invention.

Referring to FIG. 1, a user A uses a communication device 50a, and a user B uses a communication device 50b. When user B selects an item displayed on communication device 50a used by user A, communication device 50a transmits data about the selected item to communication device 50b. Communication device 50a understands by using fingerprint information of user B that user B is requesting data transmission, and thus transmits the data to communication device 50b used by user B.

(Configuration)

Figure 2:
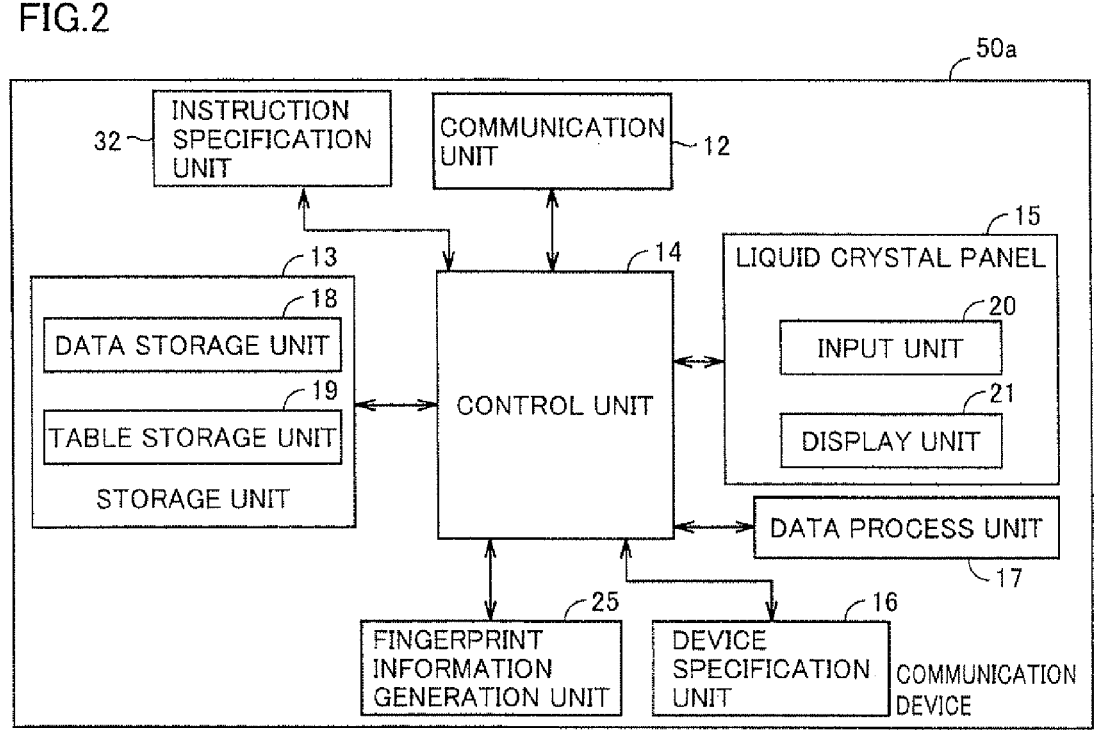
FIG. 2 represents a configuration of a communication device in the first embodiment of the present invention.

FIG. 2 represents a configuration of communication device 50a in the first embodiment of the present invention. The other communication device 50b also has a similar configuration.

Referring to FIG. 2, communication device 50a includes a storage unit 13 having a data storage unit 18 and a table storage unit 19, a liquid crystal panel 15 having a display unit 21 and an input unit 20, an instruction specification unit 32, a fingerprint information generation unit 25, a device specification unit 16, a communication unit 12, a data process unit 17, and a control unit 14.

Table storage unit 19 stores a table that determines correspondence between information about its own device and one or a plurality of other communication devices and fingerprint information of users of those devices. While fingerprint information is used as biological information here, biological information other than fingerprint information may be used.

Data storage unit 18 stores data to be transmitted to another communication device and the like.

Liquid crystal panel (display and input unit) 15 includes display unit 21 and input unit 20 that are physically integrated with each other.

Display unit 21 is formed of a liquid crystal display. Display unit 21 displays one or a plurality of items. Display unit 21 also displays, after a communication device of a user who selected an item was specified, an image requesting selection of whether or not to permit data transmission to the specified communication device.

Input unit 20 accepts operation of selecting an item by using part of a biological body, namely, a finger, of a user. Input unit 20 includes touch panel and scanner functions. As described on the Internet (http://k-tai.impress.co.jp/cda/article/news_toppage/36103.html), for example, input unit 20 is formed of an array of optical sensors each corresponding to one pixel. With this array of optical sensors, a touch panel function with which a plurality of points can be simultaneously recognized and a scanner function can be implemented without the need for a film for a touch panel on a surface. By including an optical sensor in each pixel, a plurality of points can be detected and movement thereof can be recognized when input unit 20 is operated as a touch panel, and points of the total number of pixels of liquid crystal panel 15 can be detected in principle. Further, by utilizing the feature of including an optical sensor in each pixel, a scanner function can also be implemented.

Instruction specification unit 32 specifies which item displayed on display unit 21 has been selected based on which portion of input unit 20 was touched or approached by a user's finger, and specifies data about the selected item. Instruction specification unit 32 also specifies whether or not a user has selected permission of transmission based on which portion of input unit 20 was touched or approached by a user's finger.

Fingerprint information generation unit 25 generates, at the same time as instruction specification unit 32 specifies that the user has selected an item, first fingerprint information (image data) representing a biological feature of the user who has selected the item, by scanning the user's finger. Fingerprint information generation unit 25 also generates, at the same time as instruction specification unit 32 specifies that the user has selected to permit data transmission, second fingerprint information (image data) representing a feature of a fingerprint of the user who has selected to permit transmission, by scanning the user's finger. By using the fingerprint information as the biological features of the users in this manner, the users can be accurately and readily identified.

Device specification unit 16 specifies a communication device corresponding to the first fingerprint information and a communication device corresponding to the second fingerprint information by referring to the table.

If the communication device corresponding to the second fingerprint information is its own device, communication unit 12 transmits the data to the communication device corresponding to the first fingerprint information. If the communication device corresponding to the second fingerprint information is not its own device, communication unit 12 does not transmit the data to the communication device corresponding to the first fingerprint information.

Data process unit 17 manages data, and performs ordinary data manipulation processing (expansion, movement, etc.).

Control unit 14 controls a process of each component in the communication device.

(Operation)

Figure 3:
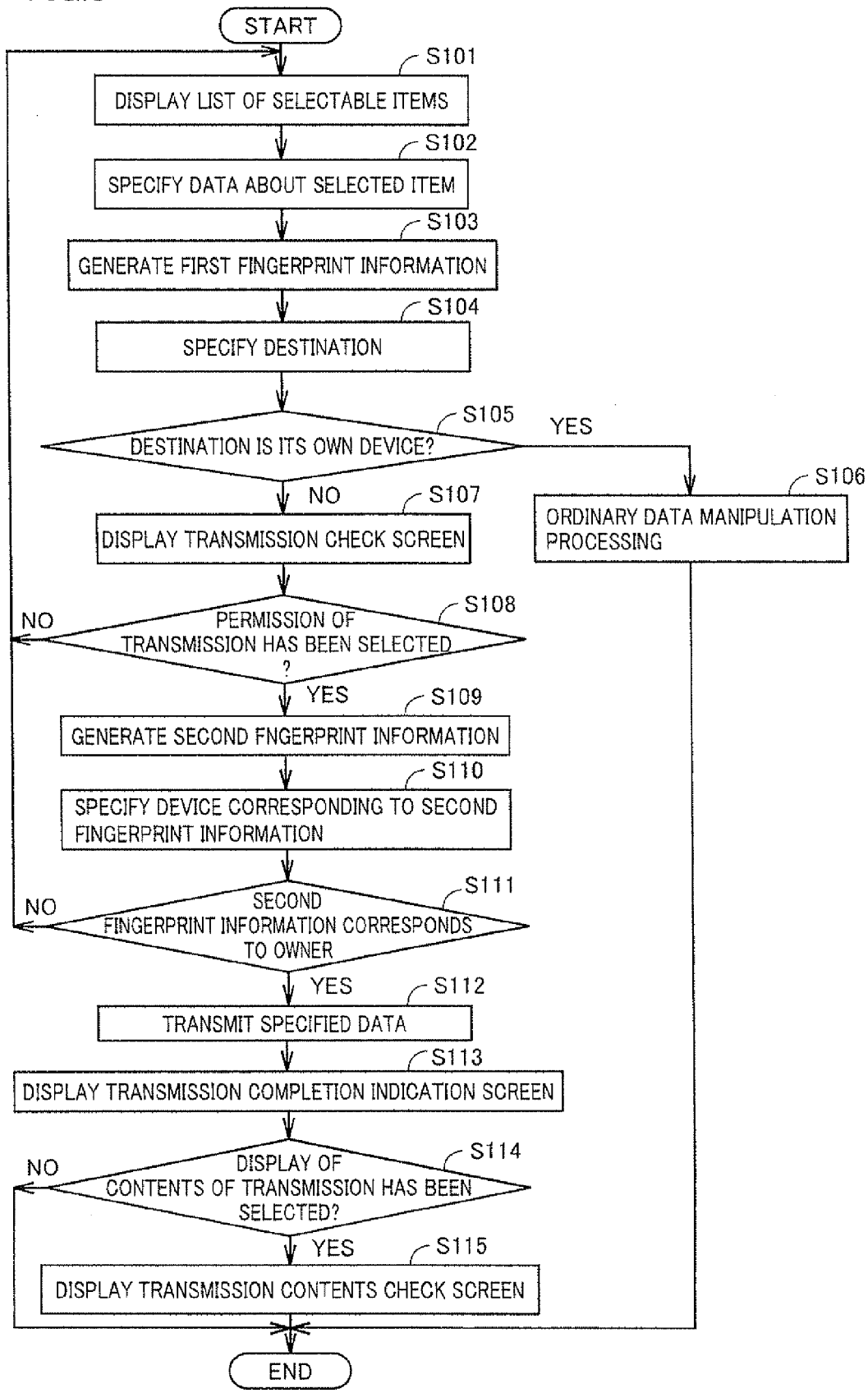
FIG. 3 is a flowchart representing an operation procedure of the communication system in the first embodiment of the present invention.

FIG. 3 is a flowchart representing an operation procedure of the communication system in the first embodiment of the present invention. FIGS. 4 to 7 represent examples of a screen in the first embodiment.

Figure 4:
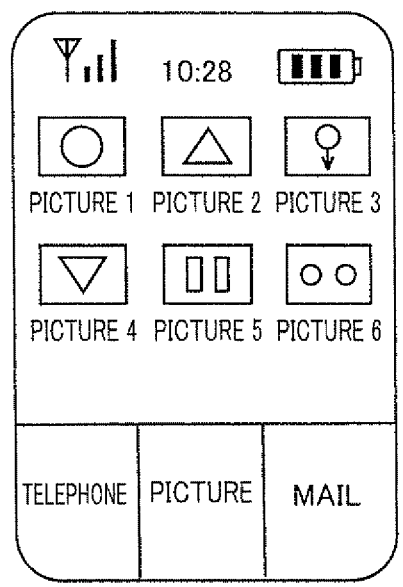
FIG. 4 represents an example of a screen in the first embodiment of the present invention.

First, display unit 21 displays a list of items that can be selected such as shown in FIG. 4 (step S101).

Then, if a user has selected an item by performing selection operation on input unit 20 with a finger, instruction specification unit 32 specifies data about the selected item (step S102).

Fingerprint information generation unit 25 generates the first fingerprint information by scanning the finger of the user who is selecting the item (step S103).

Device specification unit 16 specifies a destination communication device corresponding to the first fingerprint information by referring to the table in table storage unit 19 (step S104).

If the destination communication device is its own device (YES in step S105), data process unit 17 performs ordinary data manipulation processing (expansion, movement, etc.) (step S106).

Figure 5:
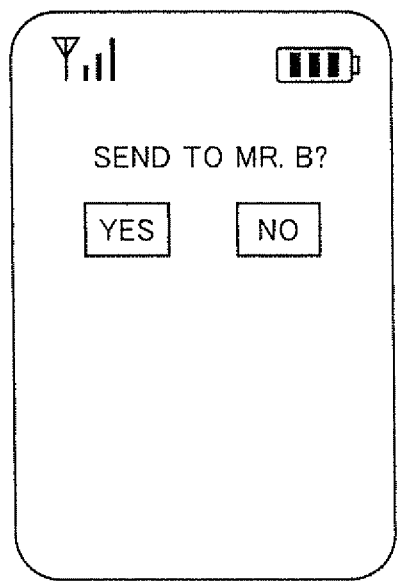
FIG. 5 represents an example of the screen in the first embodiment of the present invention.

If the destination communication device is a device other than its own device (NO in step S105), display unit 21 displays a transmission check screen such as shown in FIG. 5 (step S107).

Then, instruction specification unit 32 specifies whether or not a user has selected to permit transmission by performing selection operation on input unit 20 with a finger. If the user has selected to permit transmission (YES in S108), fingerprint information generation unit 25 generates the second fingerprint information by scanning the user's finger (step S109).

Device specification unit 16 specifies a communication device corresponding to the second fingerprint information by referring to the table (step S110).

If the communication device specified with the second fingerprint information is its own device, namely, if the owner has permitted transmission (YES in step S111), data process unit 17 transmits the specified data (step S112).

Figure 6:
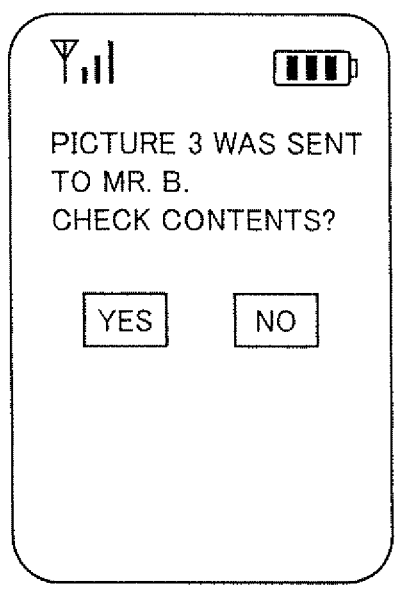
FIG. 6 represents an example of the screen in the first embodiment of the present invention.

Then, display unit 21 displays a transmission completion indication screen such as shown in FIG. 6 (step S113).

Figure 7:
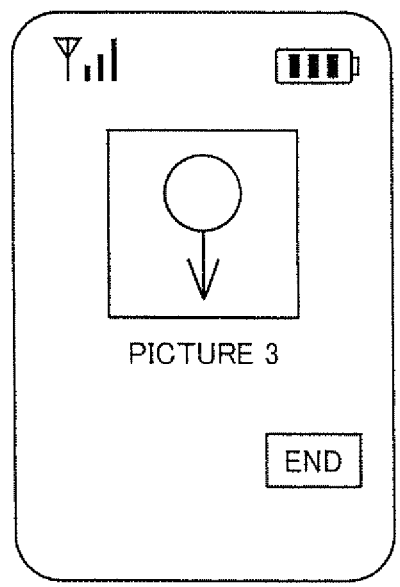
FIG. 7 represents an example of the screen in the first embodiment of the present invention.

Then, instruction specification unit 32 specifies whether or not the user has selected to display the contents of transmission by performing selection operation on input unit 20 with a finger. If the user has selected to display the contents of transmission (YES in step S114), display unit 21 displays a transmission contents check screen including an image of the transmitted data such as shown in FIG. 7 (step S115).

As described above, in the embodiment of the present invention, the storage unit stores information about another communication device and biological information of a user of the another communication device associated with each other, the display unit displays one or a plurality of items, the input unit accepts operation using part of a biological body of the user, the instruction specification unit specifies data about an item displayed on the display unit that has been selected by operation on the input unit by the user, the biological information generation unit generates first biological information representing a biological feature of the user who has selected the item, the device specification unit specifies a communication device corresponding to the generated first biological information by referring to the storage unit, and the communication unit transmits the specified data to the specified communication device. With such configuration, a data destination can be specified only by providing an instruction to a source communication device by using part of a biological body of a user who wishes to transmit the data, thereby facilitating specification of the destination as compared to the conventional selection of a destination from an address book or an ID list.

In the embodiment of the present invention, the storage unit further stores information about its own device and biological information of a user of its own device associated with each other, the display unit further displays, after the communication device corresponding to the first biological information was specified, an image requesting selection of whether or not to permit data transmission to the specified communication device, the instruction specification unit further specifies, while the image is displayed, whether or not the user has selected to permit transmission by performing operation on the input unit, the biological information generation unit further generates second biological information representing a biological feature of the user who has selected to permit transmission, the device specification unit further specifies a communication device corresponding to the generated second biological information by referring to the storage unit, and the communication unit transmits the specified data only if the communication device corresponding to the second biological information is its own device. With such configuration, data is transmitted only if a source user permits data transmission by providing an instruction to a communication device used by himself/herself by using part of his/her biological body, thereby preventing data transmission without knowledge of the source user.

In the embodiment of the present invention, the storage unit stores information about another communication device and biological information of a user of the another communication device associated with each other, the display unit displays one or a plurality of items, the input unit accepts operation using part of a biological body of the user, the specification unit specifies data about an item displayed on the display unit that has been selected by operation on the input unit by the user, the biological information generation unit generates, when the input unit accepts the operation, first biological information representing a biological feature of the user who has selected the item, and the transmission unit transmits the specified data to a communication device corresponding to the first biological information. With such configuration, a data destination can be specified only by providing an instruction to a source communication device by using part of a biological body of a user who wishes to transmit the data, thereby facilitating specification of the destination as compared to the conventional selection of a destination from an address book or an ID list.

Here, the specification unit further accepts an instruction as to selection of whether or not to transmit the specified data before transmission of the data, the storage unit stores information about its own device and biological information of a user of its own device associated with each other, the biological information generation unit generates, if the user selects to transmit the data by performing operation on the input unit, second biological information representing a biological feature of the user who has made the selection, the transmission unit transmits the specified data to the communication device corresponding to the first biological information, if the second biological information is associated with its own device after the user selected to transmit the data. With such configuration, data is transmitted if a source user permits data transmission by providing an instruction to an input unit of a communication device used by himself/herself by using part of his/her biological body, thereby preventing data transmission without knowledge of the source user.

In the embodiment of the present invention, the storage unit stores information about another communication device and biological information of a user of the another communication device associated with each other, the display and input unit can display one or a plurality of items and accept operation using part of a biological body of the user, the specification unit specifies data about an item displayed on the display and input unit that has been selected by operation on the display and input unit by the user, the biological information generation unit generates, when the display and input unit accepts the operation, first biological information representing a biological feature of the user who has selected the item, and the transmission unit transmits the specified data to a communication device corresponding to the first biological information. With such configuration, a data destination can be specified only by providing an instruction to a source communication device by using part of a biological body of a user who wishes to transmit the data, thereby facilitating specification of a destination as compared to the conventional selection of a destination from an address book or an ID list.

Here, the specification unit further accepts an instruction as to selection of whether or not to transmit the specified data before transmission of the data, the storage unit stores information about its own device and biological information of a user of its own device associated with each other, the biological information generation unit generates, if the user selects to transmit the data by performing operation on the display and input unit, second biological information representing a biological feature of the user who has made the selection, the transmission unit transmits, if the second biological information is associated with its own device after the user selected to transmit the data, the specified data to the communication device corresponding to the first biological information. With such configuration, data is transmitted if a source user permits data transmission by providing an instruction to a display and input unit of a communication device used by himself/herself by using part of his/her biological body, thereby preventing data transmission without knowledge of the source user.

If the second biological information does not correspond to its own device after the user selected to transmit the data, the transmission unit does not transmit the specified data. With such configuration, data is not transmitted if a user other than a source user permits data transmission by providing an instruction without knowledge of the source user, thereby preventing data transmission without knowledge of the source user.

[First Modification of First Embodiment]

Figure 8:
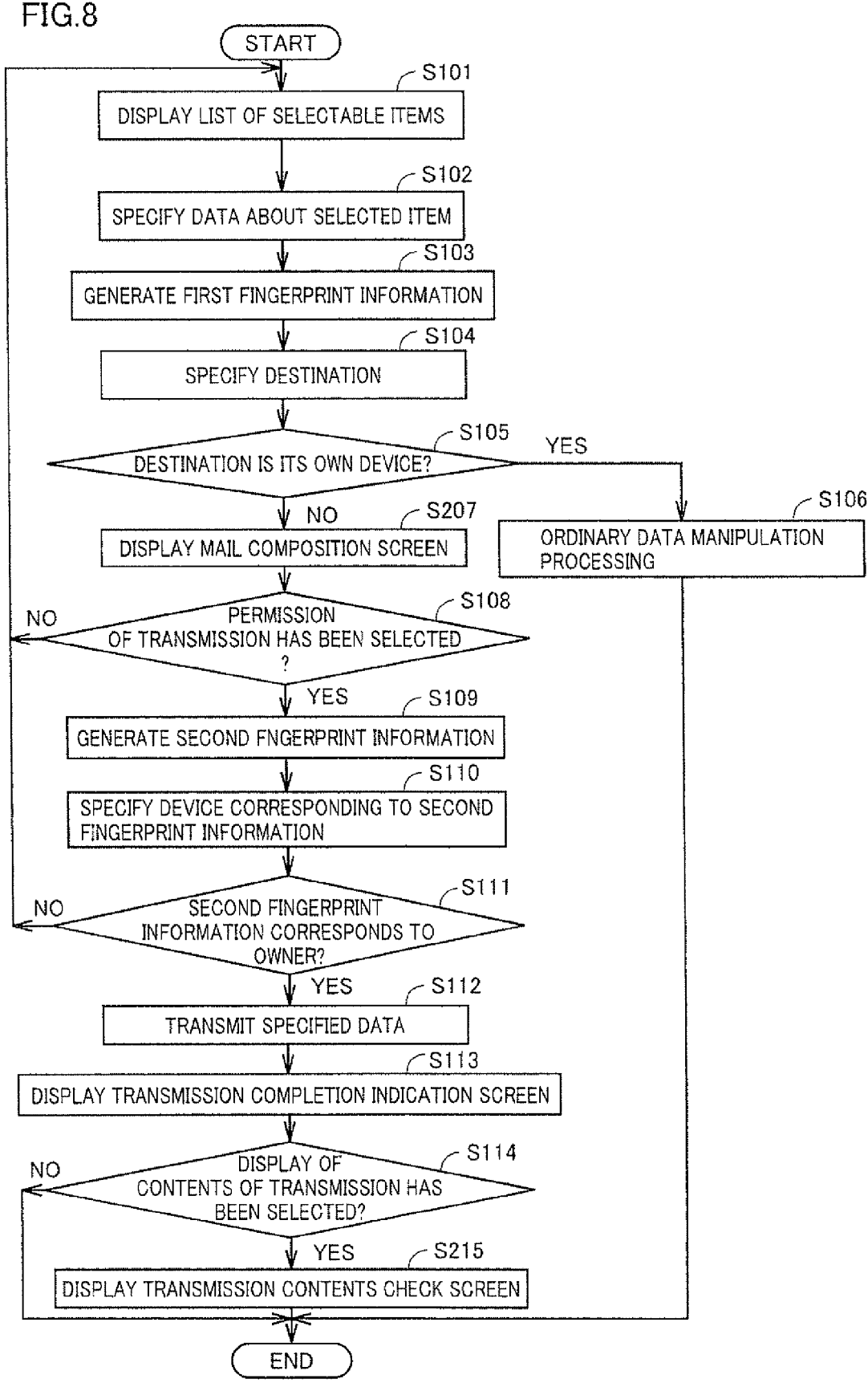
FIG. 8 is a flowchart representing an operation procedure in a modification of the first embodiment of the present invention.
Figure 9:
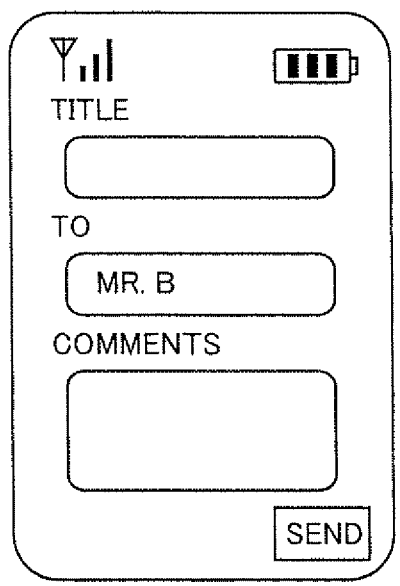
FIG. 9 represents an example of a screen in the modification of the first embodiment of the present invention.
Figure 10:
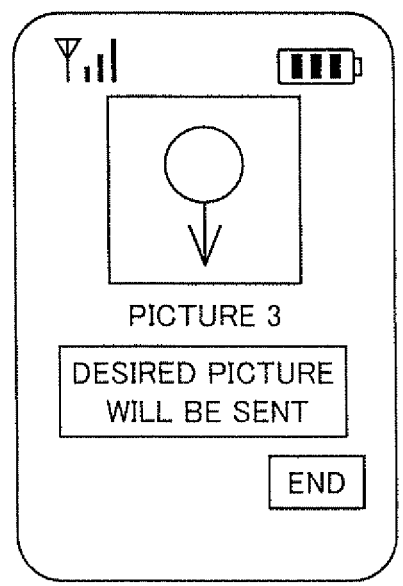
FIG. 10 represents an example of the screen in the first embodiment of the present invention.

FIG. 8 is a flowchart representing an operation procedure in a modification of the first embodiment of the present invention. FIGS. 9 and 10 represent examples of a screen in the modification of the first embodiment.

Referring to FIG. 8, the modification of the first embodiment is different from the first embodiment in that step S207 is executed instead of step S107, and step S215 is executed instead of step S115.

In step S207, display unit 21 displays a screen for composing a mail such as shown in FIG. 9. FIG. 9 displays "Mr. B" as a destination. If it is determined that the first fingerprint information belongs to "Mr. B", a mail address of Mr. B is automatically read from data storage unit 18 and input to the mail composition screen, as shown in FIG. 9.

A user further inputs characters for a title and comments via input unit 20. The characters may be selected from among displayed characters for input, or may be input with key buttons if the key buttons are provided.

In step S215, display unit 21 displays a transmission contents check screen including an image of the transmitted data and comments, such as shown in FIG. 10.

While the process returns to step S101 with "NO" in step S111 in FIG. 8, this is not restrictive, and the process may return to step S207.

[Second Modification of First Embodiment]

The communication device in the first embodiment may also be implemented by execution of a communication program by a computer. A communication program stored in a computer readable recording medium such as a CD-ROM may be installed onto a computer, or a communication program may be downloaded over the Internet to be installed onto a computer.

The communication program causes the computer to function as a storage unit for storing information about another communication device and biological information of a user of the another communication device associated with each other, a display unit for displaying one or a plurality of items, an input unit for accepting operation using part of a biological body of the user, an instruction specification unit for specifying data about an item displayed on the display unit that has been selected by operation on the input unit by the user, a biological information generation unit for generating first biological information representing a biological feature of the user who has selected the item, a device specification unit for specifying a communication device corresponding to the generated first biological information by referring to the storage unit, and a communication unit for transmitting the specified data to the specified communication device. Thus, as in the first embodiment, a data destination can be specified only by inputting a fingerprint to a data source device by a user who wishes to transmit the data, thereby facilitating specification of the destination as compared to the conventional selection of a destination from an address book or an ID list.

[Second Embodiment]

(Overview)

Figure 11:
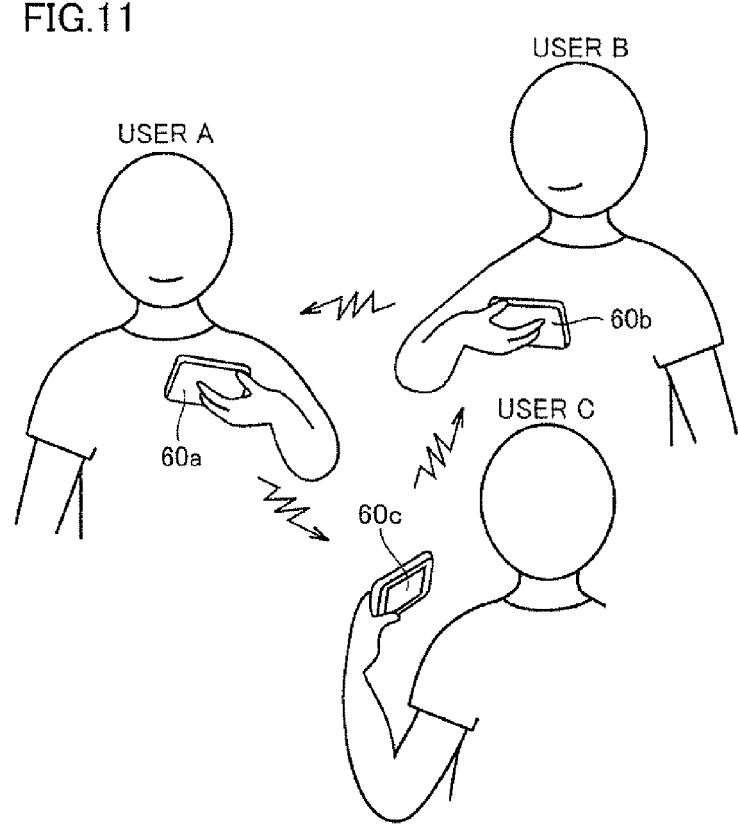
FIG. 11 illustrates an overview of a communication system in a second embodiment of the present invention.

FIG. 11 illustrates an overview of a communication system in a second embodiment of the present invention.

Referring to FIG. 11, a user A uses a communication device 60*a*, a user B uses a communication device 60*b*, and a user C uses a communication device 60*c*. Users A, B and C are playing the card game of Old Maid with communication devices 60*a*, 60*b* and 60*c*.

The communication device of each user only displays its own cards. When a user selects a card displayed on the communication device of another user with a finger, a destination of the selected card is specified based on fingerprint information of the finger, and the selected card is moved to the specified destination communication device.

(Configuration)

Figure 12:
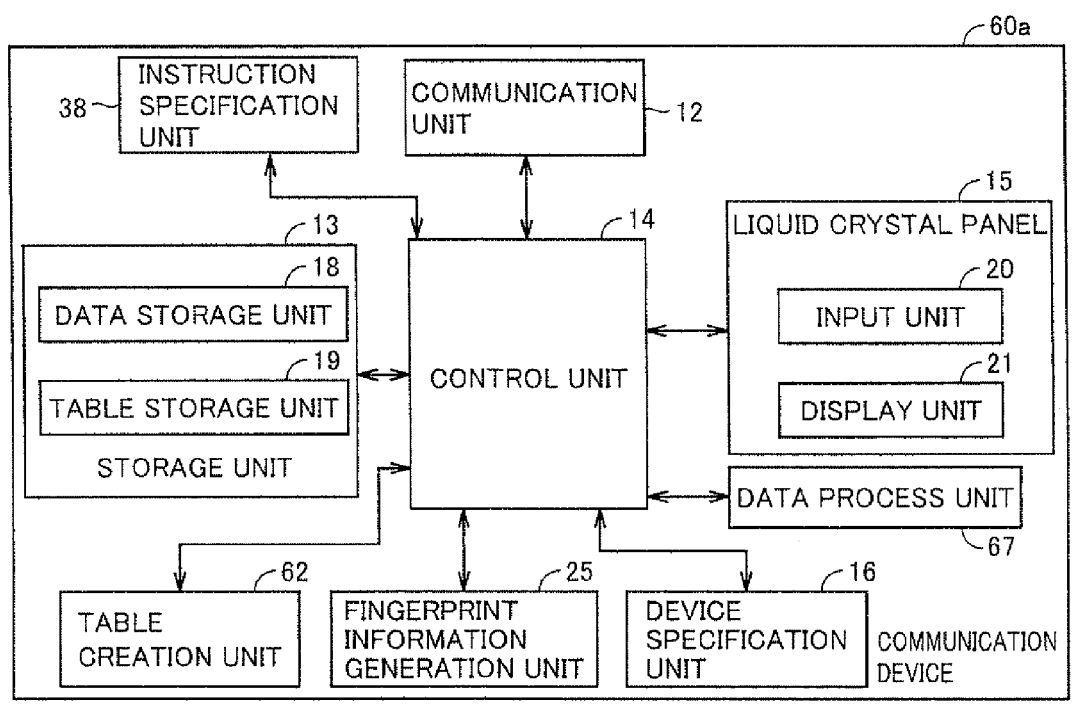
FIG. 12 represents a configuration of a communication device in the second embodiment of the present invention.

FIG. 12 represents a configuration of communication device 60*a* in the second embodiment of the present invention. The other communication devices 60*b* and 60*c* also have a similar configuration.

Referring to FIG. 12, this communication device further includes a table creation unit 62 in addition to the configuration similar to that of the first embodiment.

Table creation unit 62 creates a table that determines correspondence between ID of communication devices used by users who participate in Old Maid, and fingerprint' information of the users of those communication devices.

A data process unit 67 in the communication device in the second embodiment performs a special process for playing Old Maid. An instruction specification unit 38 in the communication device in the second embodiment specifies an instruction from a user over the course of Old Maid.

(Operation)

Figure 13:
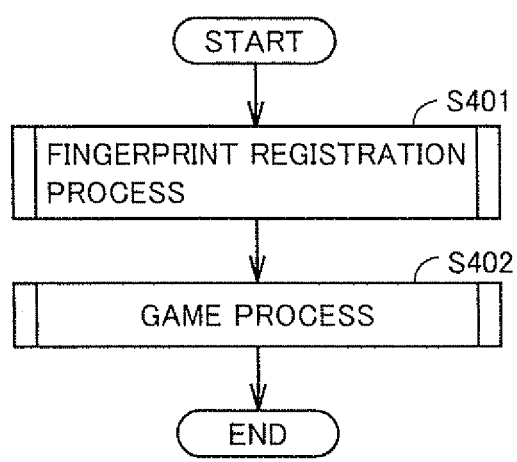
FIG. 13 is a flowchart representing an operation procedure of the communication system in the second embodiment of the present invention.
Figure 14:
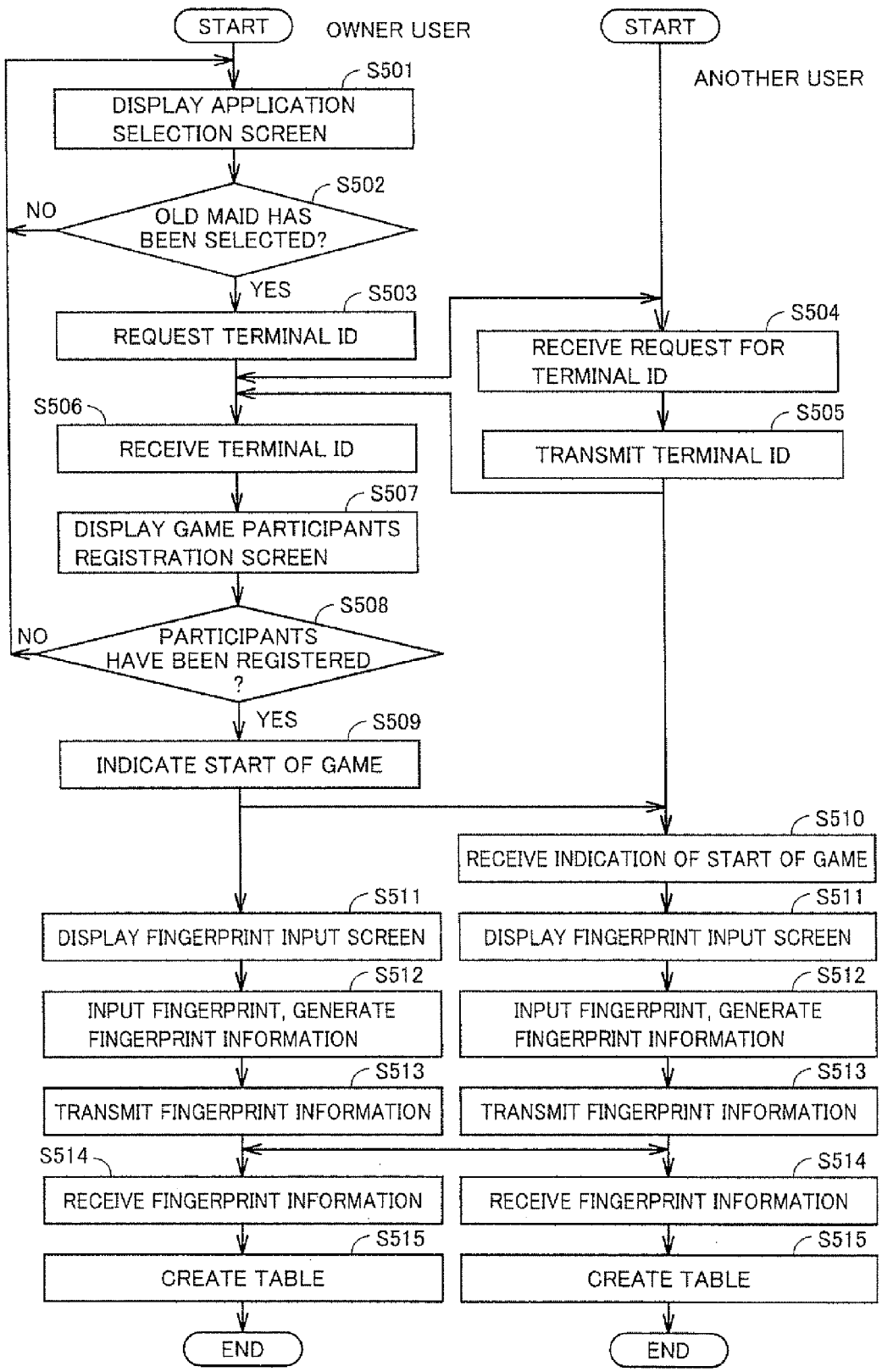
FIG. 14 is a flowchart representing an operation procedure of step S401 in FIG. 13.
Figure 15:
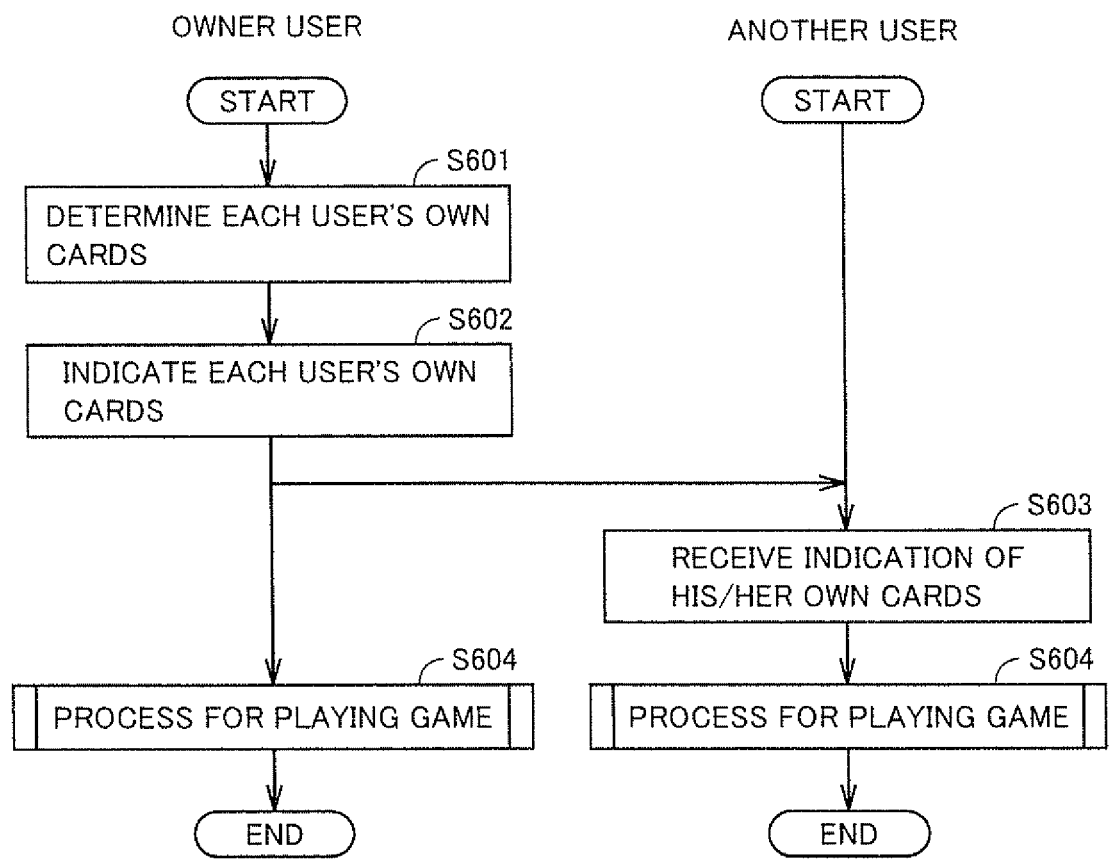
FIG. 15 is a flowchart representing an operation procedure of step S402 in FIG. 13.
Figure 16:
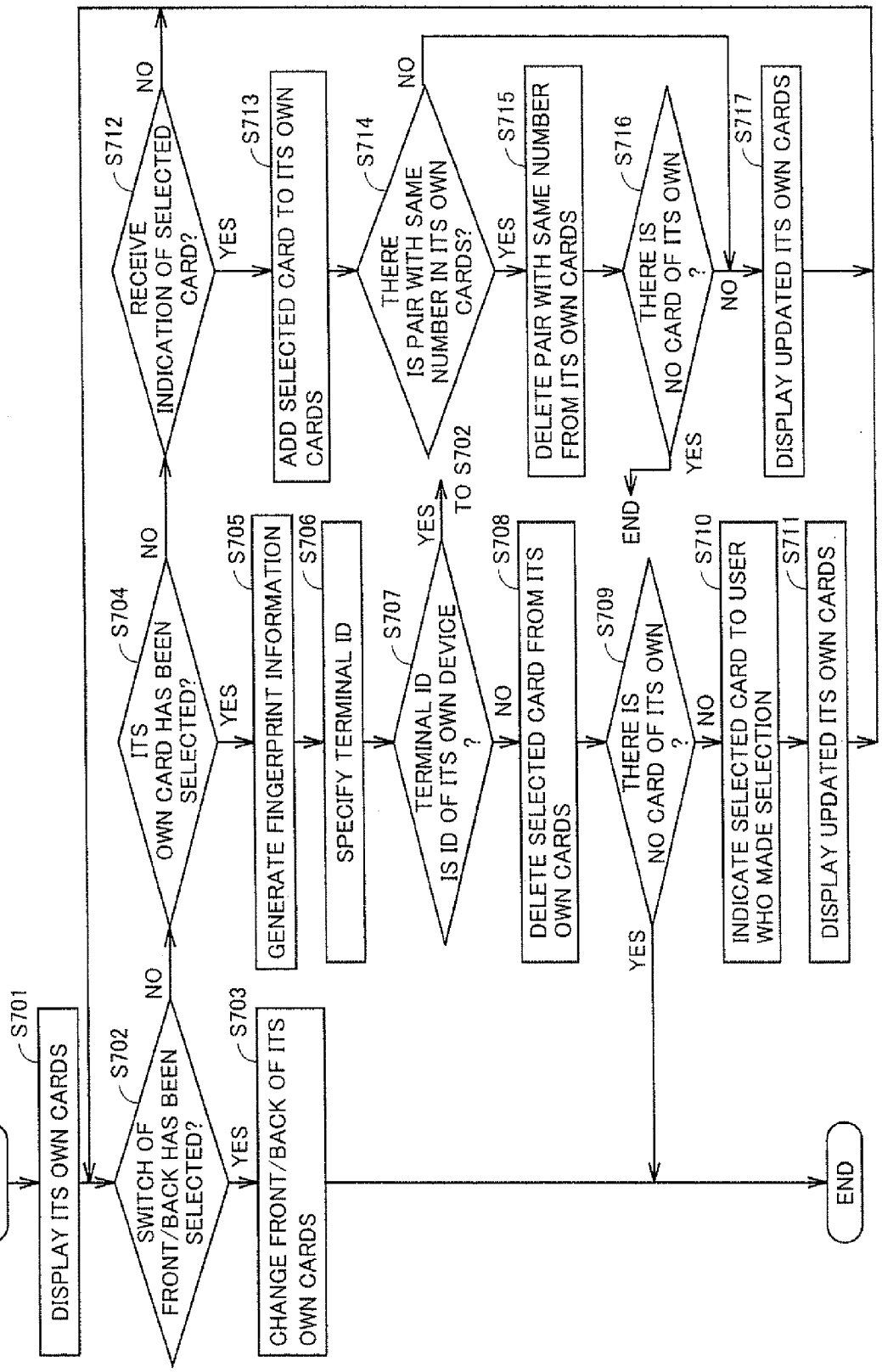
FIG. 16 is a flowchart representing an operation procedure of step S604 in FIG. 15.

FIG. 13 is a flowchart representing an operation procedure of the communication system in the second embodiment of the present invention. FIG. 14 is a flowchart representing an operation procedure of step S401 in FIG. 13. FIG. 15 is a flowchart representing an operation procedure of step S402 in FIG. 13. FIG. 16 is a flowchart representing an operation procedure of step S604 in FIG. 15. FIGS. 17 to 24 represent examples of screens of the communication devices in the second embodiment.

Referring first to FIG. 13, a process of registering fingerprints of participants in a game is initially performed (step S401), and then the game is played (step S402).

Referring now to FIG. 14, the fingerprint registration process of step S401 is described.

In FIG. 14, an "owner user" refers to a user who hosts the game.

Figure 17:
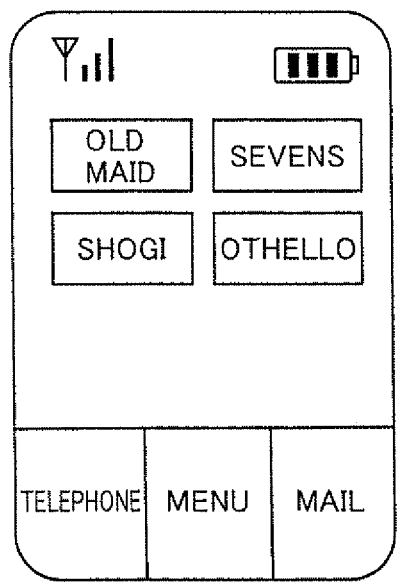
FIG. 17 represents an example of a screen in the second embodiment of the present invention.

Display unit 21 in the communication device of the owner user displays an application selection screen such as shown in FIG. 17 (step S501).

Next, if instruction specification unit 38 in the communication device of the owner user specifies that the owner user has selected Old Maid by performing selection operation on input unit 20 with a finger (YES in step 502), communication unit 12 transmits a signal requesting transmission of terminal ID of surrounding communication devices to the surrounding communication devices (step S503).

Communication units 12 in the surrounding communication devices receive this request (step S504), and return their own terminal ID (step S505).

Communication unit 12 in the communication device of the owner user receives the terminal ID from the surrounding communication devices (step S506).

Figure 18:
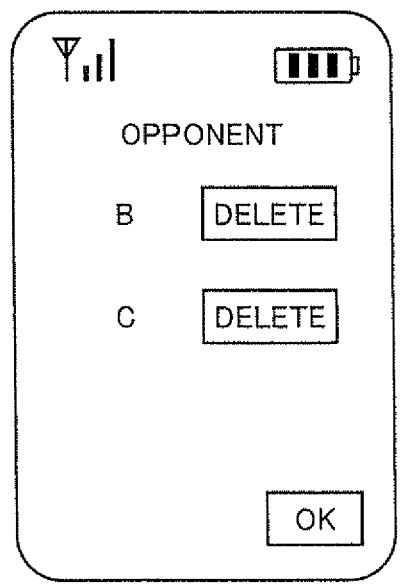
FIG. 18 represents an example of the screen in the second embodiment of the present invention.

Display unit 21 in the communication device of the owner user displays a screen requesting registration of the other users who will participate in the game, such as shown in FIG. 18 (step 507).

Next, if instruction specification unit 38 in the communication device of the owner user specifies that the owner user has registered the game participants by performing selection operation on input unit 20 with a finger (YES in step S508), communication unit 12 in the communication device of the owner user transmits a signal indicating the start of the game to the communication devices of the other users who participate in the game (step S509).

Communication units 12 in the communication devices of the other users who participate in the game receive the signal indicating the start of the game (step S510).

Figure 19:
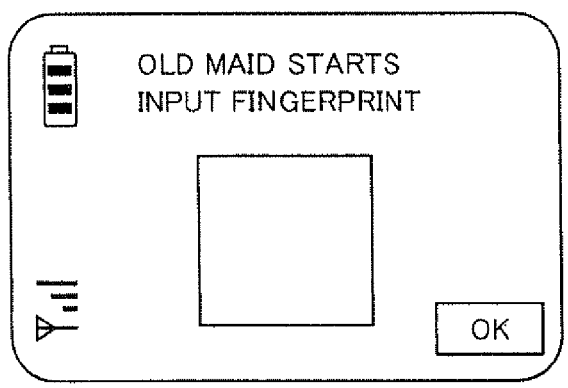
FIG. 19 represents an example of the screen in the second embodiment of the present invention.

Next, display unit 21 in the communication device of the owner user displays a fingerprint input screen such as shown in FIG. 19 (step S511).

Then, the owner user inputs a fingerprint via input unit 20, and fingerprint information generation unit 25 of the owner user generates fingerprint information by scanning the owner user's finger. Communication unit 12 in the communication device of the owner user transmits a set of the generated fingerprint information and terminal ID of its own device to the communication devices of the other users who participate in the game (step S512).

Likewise, each of the communication devices of the other users who participate in the game displays a fingerprint input screen, receives a fingerprint, generates fingerprint information, and transmits the fingerprint information (steps S511 to S513).

Next, communication unit 12 in each communication device receives a set of the fingerprint information and terminal ID from the communication devices of the other users who participate in the game (step S514).

Next, table creation unit 62 in each communication device registers correspondence relation between the terminal ID of its own device and the fingerprint information generated by its own device, and correspondence relation between the terminal ID and the fingerprint information received from the other communication devices, in a table (step S515).

Referring now to FIG. 15, the process of the game of step S402 in FIG. 13 is described.

First, data process unit 67 in the communication device of the owner user determines each user's own cards (step S601).

Then, communication unit 12 of the owner user transmits a signal indicating those cards to each of the communication devices of the other uses who participate in the game (step S602).

Then, communication units 12 in the communication devices of the other users who participate in the game receive the signals indicating their own cards, respectively (step S603).

Next, a process for playing the game is performed (step S604).

Referring now to FIG. 16, the process for playing the game of step S604 in FIG. 15 is described.

Figure 20:
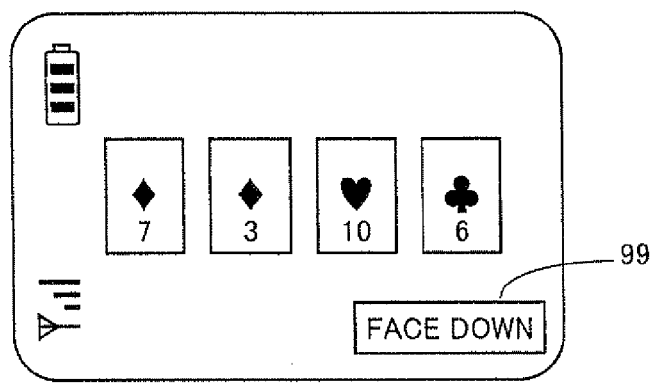
FIG. 20 represents an example of the screen in the second embodiment of the present invention.
Figure 21:
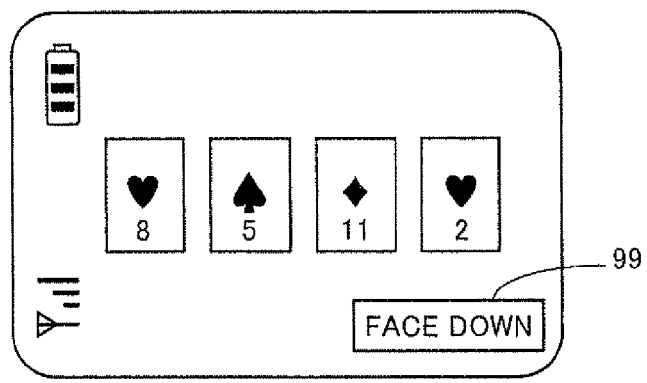
FIG. 21 represents an example of the screen in the second embodiment of the present invention.

First, as shown in FIGS. 20 and 21, display unit 21 displays its own cards (step S701). FIG. 20 represents a screen of the communication device of the owner user, and FIG. 21 shows a screen of the communication device of another user.

Figure 22:
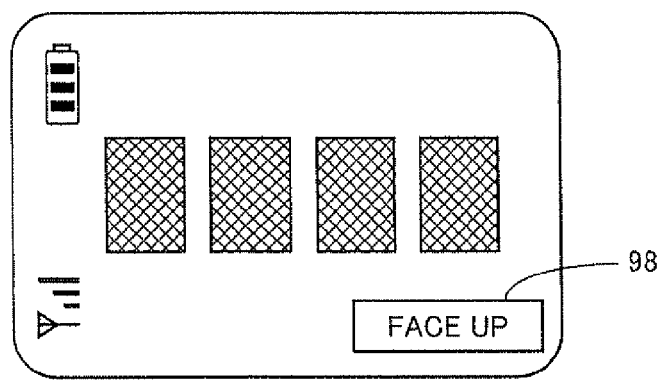
FIG. 22 represents an example of the screen in the second embodiment of the present invention.

Next, instruction specification unit 38 specifies whether or not the user has selected to switch display of front side/back side by performing selection operation via input unit 20. If instruction specification unit 38 specifies that the user has selected to switch display of front side/back side (YES in step S702), display unit 21 displays the back sides of the cards if the front sides are being displayed, and displays the front sides of the cards if the back sides are being displayed. For example, if a face-down icon 99 is selected while the front sides of the cards are displayed as shown in FIG. 21, display unit 21 displays the back sides of the cards as shown in FIG. 22. On the other hand, if a face-up icon 98 is selected while the back sides of the cards are displayed as shown in FIG. 22, display unit 21 displays the front sides of the cards as shown in FIG. 21 (step S703).

Next, instruction specification unit 38 specifies whether or not the user has selected one of its own cards by performing selection operation via input unit 20. If instruction specification unit 38 specifies that the user has selected one of its own cards (YES in step S704), fingerprint information generation unit 25 generates fingerprint information by scanning the fingerprint of the user who is selecting the card (step S705).

Next, device specification unit 16 specifies terminal ID corresponding to the generated fingerprint information by referring to the table. If the specified terminal ID is not the terminal ID of its own device (YES in step S707), data process unit 67 deletes the selected card from its own cards (step S708).

If there is no card of its own (YES in step S709), data process unit 67 ends the game.

If there is any card of its own (NO in step S709), communication unit 12 transmits a signal indicating the selected card to a communication device of the specified terminal ID (step S710).

Figure 23:
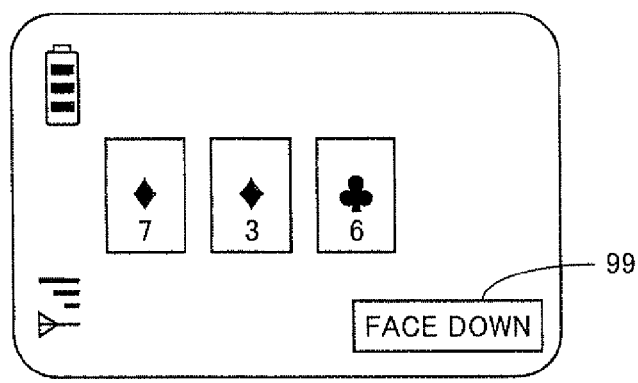
FIG. 23 represents an example of the screen in the second embodiment of the present invention.

Then, display unit 21 displays its own cards that have been updated by the deletion of the selected card, as shown in FIG. 23. FIG. 23 represents the screen of the communication device of the owner user. In FIG. 23, a card has been deleted from the screen shown in FIG. 20 (step S711).

If communication unit 12 receives the signal indicating the selected card from another communication device (YES in step S712), data process unit 67 adds the selected card to its own cards (step S713).

If there is a pair of cards with the same number in its own cards (YES in step S714), data process unit 67 deletes the pair of cards from its own cards (step S715).

If there is no card of its own (YES in step S716), data process unit 67 ends the game.

Figure 24:
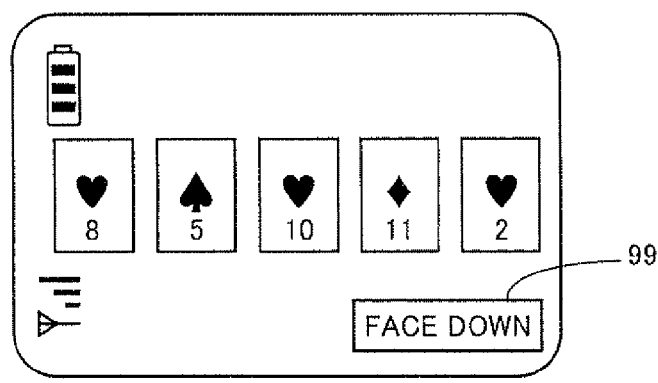
FIG. 24 represents an example of the screen in the second embodiment of the present invention.

If there is any card of its own (NO in step S716), on the other hand, display unit 21 displays its own cards that have been updated by the addition of the selected card, as shown in FIG. 24. FIG. 24 represents the screen of the communication device of the another user. In FIG. 24, a card has been added to the screen shown in FIG. 21 (step S717).

As described above, in the second embodiment of the present invention, as in the first embodiment, a destination can be readily specified, and data transmission without knowledge of a source user can be prevented.

In the second embodiment, the table creation unit creates a table that associates information about its own device and another communication device with biological information of users of its own device and the another communication device, the biological information generation unit generates biological information representing a biological feature of the user of its own device during registration of the biological information, the communication unit receives the biological information of the user of the another communication device from the another communication device, and the table creation unit creates a table based on the biological information of the user of its own device generated during the registration of the biological information and the received biological information of the user of the another communication device. As a result, the table can be readily and quickly created.

[Modification of Second Embodiment]

(Overview)

Figure 25:
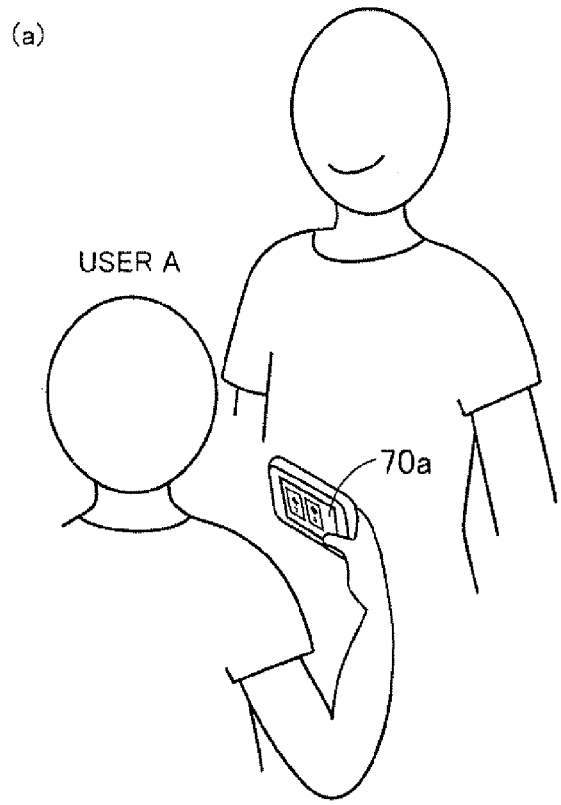
FIG. 25 illustrates an overview of a modification of the second embodiment of the present invention.
Figure 25:
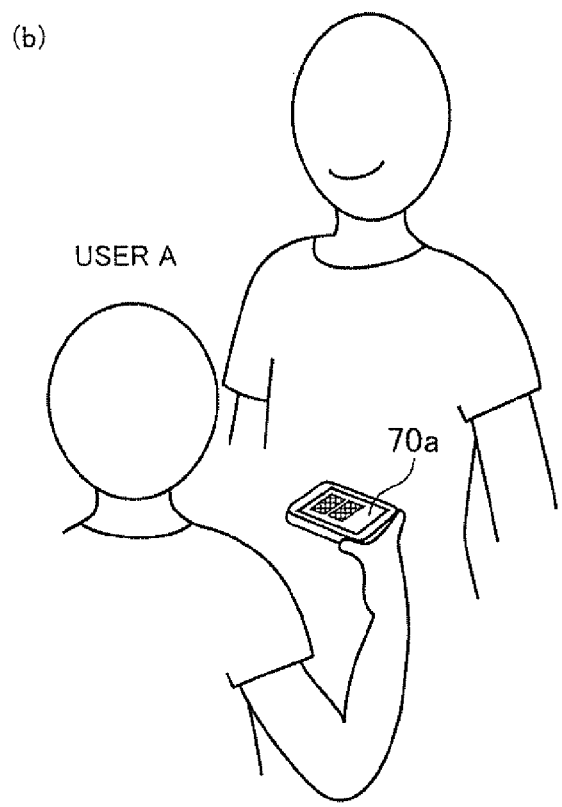

FIG. 25 illustrates an overview of a modification of the second embodiment. When user A aims a display unit of a communication device 70a toward oneself, the front sides of its own cards are displayed as shown in FIG. 25(a). When user A inclines communication device 70a so that user B can see the display unit of communication device 70a, on the other hand, the back sides of its own cards are displayed as shown in FIG. 25(b). Whether or not the communication device has inclined is detected with an inclination sensor.

(Configuration)

Figure 26:
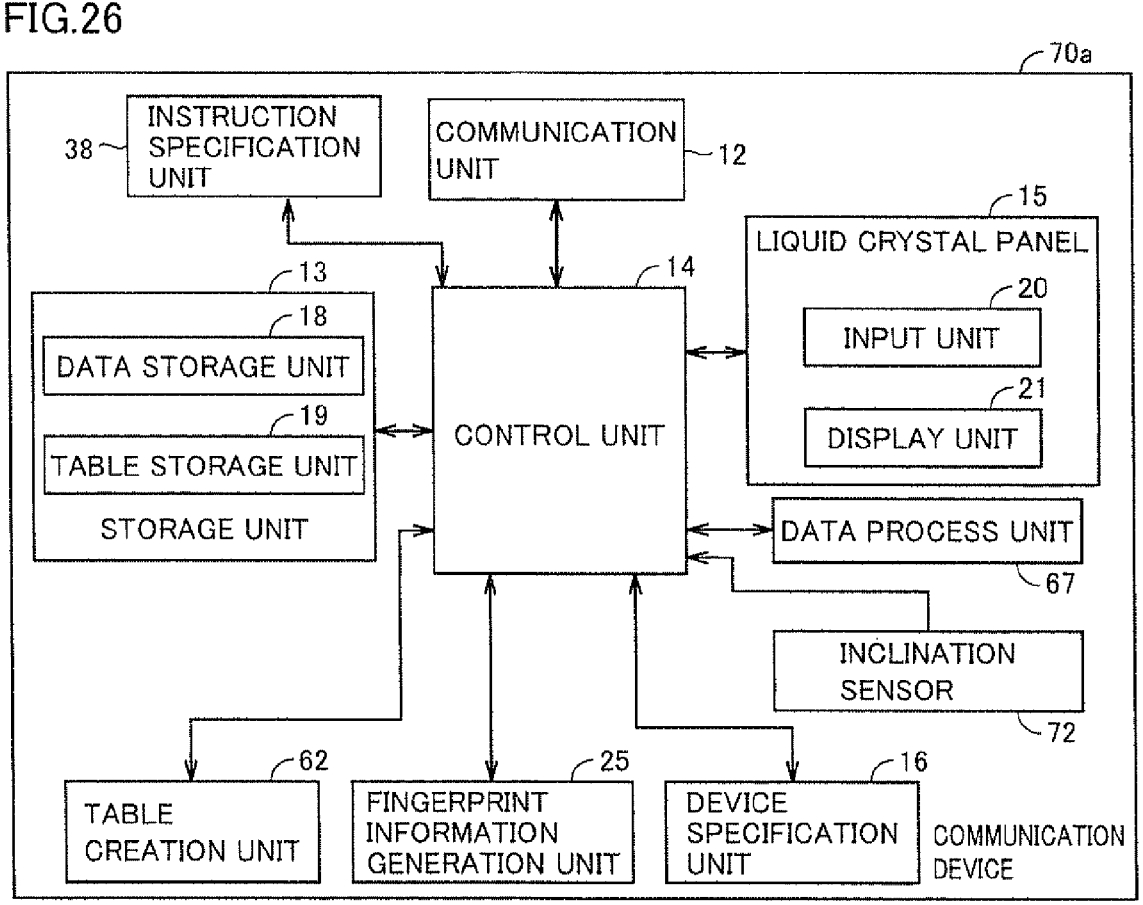
FIG. 26 represents a configuration of a communication device in the modification of the second embodiment of the present invention.

FIG. 26 represents a configuration of communication device 70a in the modification of the second embodiment.

Referring to FIG. 26, this communication device further includes an inclination sensor 72 in addition to the configuration of communication device 60a in the second embodiment.

Inclination sensor 72 is formed of a magnetic sensor, an acceleration sensor or the like, and detects inclination of the communication device. Display unit 21 changes a form of displaying the cards depending on the inclination of the communication device. Namely, when the inclination of the communication device is within a predetermined range that allows another person to see display unit 21, display unit 21 displays the back sides of cards, and when the inclination of the communication device is outside the predetermined range, display unit 21 displays the front sides of cards. As such, in this modification, the detection unit detects inclination of the communication device, and the display unit changes a form of displaying an item depending on the detected inclination of the communication device. As a result, an item of which a high degree of privacy or security is required can be prevented from being seen by another person.

(Modification)

The present invention is not limited to the embodiments described above, but includes the following modifications, for example.

(1) Input Unit

While an array of optical sensors each corresponding to one pixel is used as the input unit to scan a selected item on a liquid crystal display and fingerprint information of a user who has made the selection in the embodiment of the present invention, this is not restrictive. A pressure-sensitive touch panel may be used as the input unit to detect which item on the liquid crystal display has been selected. Alternatively, fingerprint information of a user may be generated by a device independent of a touch panel. The input unit is not limited to these devices, but may be any touch panel capable of fingerprint authentication. For example, fingerprint information may be generated for use by a capacitance-type touch panel based on a sensed capacitance.

(2) Human Body Communication

While a destination communication device is specified by identifying a user based on a fingerprint in the embodiment of the present invention, this is not restrictive, and a human body communication technique may be utilized. For example, information about a communication device owned by a user who has touched a touch panel (destination communication device) may be transmitted through the human body of the user to the touched communication device (source communication device). Known human body communication techniques include RedTacton where information is transmitted by a change in minute electric field induced in a body by a transmitter. RedTacton is described in detail on the Internet (http://www.redtacton.com), for example.

(3) Fingerprint Registration

While a table is created by inputting a fingerprint by a user to a communication device used by himself/herself, and by transmitting generated fingerprint information to another communication device in the embodiment of the present invention, this is not restrictive.

For example, all users may input their fingerprints to a communication device used by an owner user, and the communication device of the owner user may create a table by generating fingerprint information of all the users, and transmit the created table to the other communication devices.

(4) Old Maid

While a signal indicating movement of a card to a communication device of a user who has selected the card is transmitted in the embodiment of the present invention, this is not restrictive, and this signal may be transmitted to all the other communication devices. This allows each communication device to hold states of the cards of all users participating in Old Maid.

(5) Selection Unit

Figure 27:
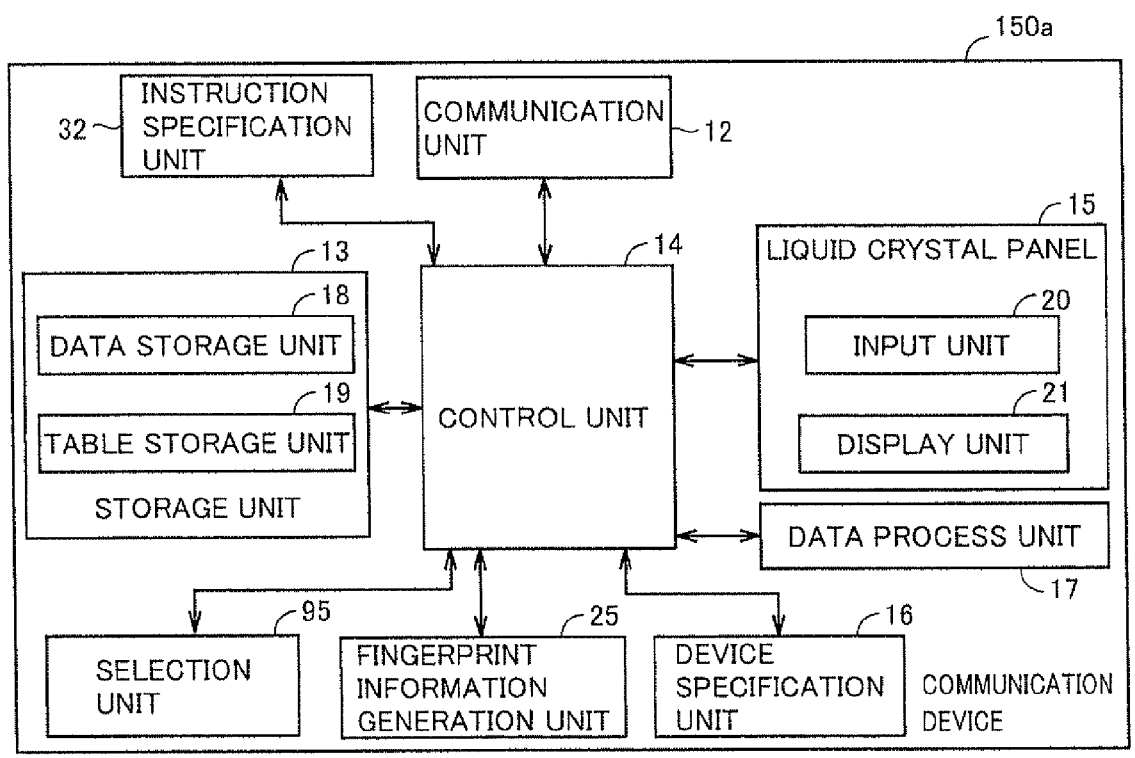
FIG. 27 illustrates an overview of a communication system in a modification of the present invention.

While instruction specification unit 32 specifies whether or not the user has selected to permit transmission by performing selection operation on input unit 20 with a finger in the embodiment of the present invention, this is not restrictive. As shown in FIG. 27, a selection unit 95 independent of instruction specification unit 32 may be provided, to specify whether or not the user has selected to permit transmission by performing selection operation on input unit 20 with a finger.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

Reference Signs List 12 communication unit; 13 storage unit; 14 control unit; 15 liquid crystal panel; 16 device specification unit; 17 data process unit; 18 data storage unit; 19 table storage unit; 20 input unit; 21 display unit; 25 fingerprint information generation unit; 32, 38 instruction specification unit; 62 table creation unit; 67 data process unit; 72 inclination sensor; 50a, 50b, 50c, 60a, 60b, 60c, 70a, 150a communication device; 95 selection unit; 98 face-up icon; 99 face-down icon.

The invention claimed is:

1. A communication device comprising:
a storage unit for storing information about another communication device and fingerprint information associated with a user of the another communication device;
a display unit for displaying one or a plurality of items;
an input unit for accepting an operation using a finger of the user of the another communication device,
an instruction specification unit for specifying data about an item displayed on the display unit that has been selected by the operation on the input unit by the user of the another communication device;
a biological information generation unit for generating, while the finger of the user touches an area where the selected item is displayed, first fingerprint information of the finger of the user of the another communication device, which is used to select the item;
a device specification unit for specifying a communication device corresponding to the generated first fingerprint information by referring to the storage unit; and
a communication unit for transmitting the specified data to the specified communication device.

2. The communication device according to claim 1, further comprising a table creation unit for creating a table associating information about the communication device and the another communication device with fingerprint information of users of the communication device and the another communication device, wherein
- the biological information generation unit generates fingerprint information representing a fingerprint feature of the user of the communication device during registration of the fingerprint information,
- the communication unit receives the fingerprint information of the user of the another communication device from the another communication device, and
- the table creation unit creates the table based on the fingerprint information of the user of the communication device generated during the registration of the fingerprint information, and the received fingerprint information of the user of the another communication device.

3. The communication device according to claim 2, wherein the storage unit further stores the information about the communication device and the fingerprint information associated with a user of the communication device,
- the display unit further displays, after the communication device corresponding to the first fingerprint information was specified, an image requesting selection of whether or not to permit data transmission to the specified communication device,
- the instruction specification unit further specifies, while the image is displayed, whether or not the user has selected to permit the transmission by performing the operation on the input unit,
- the biological information generation unit further generates, if permission of the transmission is selected, second fingerprint information of a finger of the user of the communication device, which is used to permit the transmission,
- the device specification unit further specifies a communication device corresponding to the generated second fingerprint information by referring to the storage unit, and
- the communication unit transmits the specified data only if the communication device corresponding to the second fingerprint information is the communication device.

4. The communication device according to claim 3, further comprising a detection unit for detecting an inclination of the communication device, wherein
- the display unit changes a form of displaying the item depending on the detected inclination of the communication device.

5. A communication device comprising:
- a storage unit for storing information about another communication device and fingerprint information associated with a user of the another communication device;
- a display unit for displaying one or a plurality of items;
- an input unit for accepting an operation using a finger of the user of the another communication device,
- a specification unit for specifying data about an item displayed on the display unit that has been selected by the operation on the input unit by the user of the another communication device;
- a biological information generation unit for generating, while the finger of the user touches an area where the selected item is displayed, first fingerprint information of the finger of the user of the another communication device, which is used to select the item; and
- a transmission unit for transmitting the specified data to a communication device corresponding to the first fingerprint information.

6. The communication device according to claim 5, wherein the specification unit further accepts an instruction as to selection of whether or not to transmit the specified data before transmission of the specified data,
- the storage unit stores information about the communication device and fingerprint information associated with a user of the communication device,
- the biological information generation unit generates, if the user selects to transmit the specified data by performing the operation on the input unit, second fingerprint information of a finger of the user of the communication device, which is used to select to transmit the specified data, and
- the transmission unit transmits the specified data to the communication device corresponding to the first fingerprint information, if the second fingerprint information is associated with the communication device after the user selected to transmit the data.

7. The communication device according to claim 6, wherein
- the transmission unit does not transmit the specified data if the second fingerprint information does not correspond to the communication device after the user selected to transmit the data.

8. A communication device comprising:
- a storage unit for storing information about another communication device and fingerprint information associated with a user of the another communication device;
- a display and input unit configured to display one or more of a plurality of items and accept an operation using a finger of the user;
- a specification unit for specifying data about an item displayed on said display and input unit that has been selected by operation on the display and input unit by the user of the another communication device;
- a biological information generation unit for generating, while the finger of the user touches an area where the selected item is displayed, first fingerprint information of the finger of the user of the another communication device, which is used to select the item; and
- a transmission unit for transmitting the specified data to a communication device corresponding to the first fingerprint information.

9. The communication device according to claim 8, wherein the specification unit further accepts an instruction as to selection of whether or not to transmit the specified data before transmission of the specified data,
- the storage unit stores information about the communication device and fingerprint information associated with of a user of the communication device,
- the biological information generation unit generates, if the user selects to transmit the specified data by performing the operation on the input unit, second fingerprint information of a finger of the user of the communication device, which is used to select to transmit the specified data, and
- the transmission unit transmits the specified data to the communication device corresponding to the first fingerprint information, if the second fingerprint information is associated with the communication device after the user selected to transmit the data.

10. The communication device according to claim 9, wherein the transmission unit does not transmit the specified data if the second fingerprint information does not correspond to the communication device after the user selected to transmit the data.

11. A communication system including a plurality of communication devices, comprising:
    a source communication device including:
        a storage unit for storing information about another communication device of the plurality of communication devices, and fingerprint information associated with a user of the another communication device;
        a display unit for displaying one or a plurality of items;
        an input unit for accepting an operation using a finger of the user of the another communication device,
        an instruction specification unit for specifying data about an item displayed on the display unit that has been selected by the operation on the input unit by the user of the another communication device;
        a biological information generation unit for generating, while the finger of the user touches an area where the selected item is displayed, first fingerprint information of the finger of the user of the another communication device, which is used to select the item;
        a device specification unit for specifying a communication device corresponding to the generated first fingerprint information by referring to the storage unit; and
        a communication unit for transmitting the specified data to the specified communication device, wherein the specified communication device includes a communication unit for receiving the data transmitted from the source communication device.

12. A non-transitory computer readable recording medium with stored instructions recording a communication program causing a computer to function as:
    a storage unit for storing information about another communication device of the plurality of communication devices, and fingerprint information associated with a user of the another communication device;
    a display unit for displaying one or a plurality of items;
    an input unit for accepting an operation using a finger of the user of the another communication device,
    an instruction specification unit for specifying data about an item displayed on the display unit that has been selected by the operation on the input unit by the user of the another communication device;
    a biological information generation unit for generating, while the finger of the user touches an area where the selected item is displayed, first fingerprint information of the finger of the user of the another communication device, which is used to select the item;
    a device specification unit for specifying a communication device corresponding to the generated first fingerprint information by referring to the storage unit; and
    a communication unit for transmitting the specified data to the specified communication device.

* * * * *